United States Patent [19]
Goodman

[11] Patent Number: 5,416,697
[45] Date of Patent: May 16, 1995

[54] METHOD FOR DETERMINING ROCK MECHANICAL PROPERTIES USING ELECTRICAL LOG DATA

[75] Inventor: Harvey E. Goodman, Kingwood, Tex.

[73] Assignee: Chevron Research and Technology Company, San Francisco, Calif.

[21] Appl. No.: 923,400

[22] Filed: Jul. 31, 1992

[51] Int. Cl.⁶ .................. G06F 15/48; G06F 15/50
[52] U.S. Cl. .................. 364/422; 364/420; 364/421
[58] Field of Search .................. 364/420, 422

Primary Examiner—Gail O. Hayes
Assistant Examiner—Joseph Thomas
Attorney, Agent, or Firm—M. W. Carson

[57] ABSTRACT

A method for determining rock mechanical properties and for selecting a drill bit is disclosed. A set of electrical log data parameters over a selected zone in a wellbore is provided, and the respective shale and non-shale volumes are determined. A fluid-corrected Poisson's ratio for the non-shale volume is determined. Shear wave velocity for the shale volume is then determined and a corrected Poisson's ratio, relating to shale volume and fluid composition is determined. Uniaxial compressive strength, angle of internal friction, and cohesive shear strength can be determined, and drill bits selection can therefore be made more accurately.

3 Claims, 7 Drawing Sheets

FIG_1

FIG_2

FIG_3

FIG_4

FIG_5

FIG_5 (cont.)

FIG_6

METHOD FOR DETERMINING ROCK MECHANICAL PROPERTIES USING ELECTRICAL LOG DATA

FIELD OF THE INVENTION

The invention relates generally to the field of rock mechanics. More specifically, this invention provides a method for determining rock mechanics properties and selecting a drill bit for use in drilling a well, using electrical log data from an offset well to determine compressive strength, cohesive shear strength, and the angle of internal friction of selected zones of the offset well.

BACKGROUND OF THE INVENTION

The cost of drilling oil and gas wells is extremely expensive. For example, many drilling rigs operating in the Gulf of Mexico command approximately $50,000 per day. Some drilling rigs operating in remote regions or some offshore areas cost up to $750,000 per day. Consequently, it is desirable to improve drilling efficiency by decreasing the amount of rig time required to reach the objective depth of the well. Optimizing drill bit selection type and timing can dramatically reduce the required drilling time. Knowledge of the rock properties is useful in making such drill bit selection.

Previous attempts have been made to assess formation drillability from petrophysical log measurements. Gstalder and Raynal published a paper in 1966 entitled "Measurement of Some Mechanical Properties of Rocks and Their Relationship to Rock Drillability", Jour. Petrol. Technology; August 1966; pp. 991–996, which discloses that rock hardness increases as compressional wave (P-Wave) velocities from conventional acoustic wireline tools increase. Therefore, rock hardness determined in the laboratory or estimated from acoustic logging could be used to predict drilling performance. However, no technique for predicting drill bit performance based on determined rock strength properties was disclosed. Somerton, in 1970, in a publication entitled "Well Logs Predict Drillability, Aid Computers", Oil & Gas Journal; Nov. 23, 1970; pp. 78–86, disclosed that acoustic log travel times correlated well with rock drillability, provided that a mineralogical factor is taken into account. However, no technique for predicting drill bit performance based a determined rock strength properties was disclosed.

Mason, in 1984, in a publication entitled "Three-Cone Bit Selection With Sonic Logs", SPE Drilling Jour.; June, 1987; pp. 135–142, disclosed that formation compressive strengths increase as calculated formation shear wave (S-wave) velocities increase. A correlation was made between conventional roller cone bit economic performance from various offset wells and calculated S-wave travel times. Mason's method for calculating formation S-wave velocities is extremely dependent upon mineral composition and an idealized table of P-wave/S-wave velocity ratios. Applicant's invention utilizes a more complicated and unique analytical technique to determine S-wave velocities. Also, the present invention uses electrical log derived compressive strength, cohesive strength, and angle of internal friction for diamond bit selection, as opposed to roller cone or rock bit selection. More importantly, the present invention relies on calculated rock strengths and abrasiveness estimates by bit company laboratory estimates, in addition to field performance trials, instead of the prior method of mainly comparing offset bit performance.

Onyia, in 1988, in SPE Paper No. 18166, entitled "Relationship Between Formation Strength, Drilling Strength, and Electric Log Properties", estimated rock strength from wireline logs. Laboratory measured rock core strengths were correlated to wireline acoustic and resistivity data. The core/log derived strengths were then related to the drilling performance of roller cone bits, at a close by test well. Onyia stated that given a formation rock strength and drilling parameters, approximate drilling rates can be predicted. There was no mention of selecting bits according to wireline log derived rock strengths.

Deinbach, in a Jun. 14, 1982 Oil and Gas Journal article entitled "Sonic-Gamma Ray Log Analysis Improves Bit Selection", discloses a method of selecting drill bits using sonic and gamma ray logs from nearby wells. The response of the sonic log to porosity has a close relationship to rock strength. When shale content is included, via the gamma ray log, bit selection is performed. No actual rock mechanics properties are calculated, however, and the relationships are merely qualitative.

U.S. Pat. Nos. 3,896,668 and 3,946,604, issued to Anderson, and Anderson et al. respectively, disclose methods of using sonic and density log data to determine a shaliness index, which is used to compute Poisson's ratio. Elastic constants, such as shear modulus and bulk compressibility are determined, which provide indications of a formation's strength, to ascertain competent from incompetent formations, and to help plan sand controlling techniques such as gravel packing.

None of the prior efforts described above provide a method for quantitatively determining rock mechanic's properties such as compressive strength, cohesive shear strength, and the angle of internal friction of an offset well from electrical log data, for selecting a drill bit. There is therefore a need for an improved, accurate, simple, and economic method for determining these rock properties and selecting a drill bit.

SUMMARY OF THE INVENTION

A method for determining rock mechanical properties using electrical log data is described. A set of electrical log data parameters comprising water saturation, porosity, and P-wave velocity over a selected zone in a wellbore is provided. The respective volumes of shale and non-shale for the selected zone is determined. A fluid-corrected Poisson's ratio for the non-shale volume is determined by determining pore fluid density, bulk density, bulk modulus of the pore fluid, bulk modulus of dry rock, bulk modulus of pore volume, shear modulus of dry rock, corrected P-wave velocity, and corrected S-wave velocity. S-wave velocity is then determined for the shale volume and a corrected Poisson's ratio, relating to shale volume and fluid composition is determined.

Another object of the invention is to further determine the uniaxial compressive strength over the zone, as a function of S-wave velocity. The angle of internal friction over the zone, as a function of the corrected Poisson's ratio, and cohesive shear strength as a function of compressive strength and angle of internal friction can be determined. The present invention can be utilized to select a drill bit for use in drilling a well.

DETAILED DESCRIPTION OF THE INVENTION

The present invention provides various rock mechanical properties including a corrected Poisson's ratio, uniaxial compressive strength, angle of internal function, and cohesive shear strength over a selected zone of a wellbore, from existing electrical log data. These rock properties are useful to, for example, plan a drill bit selection program for drilling a nearby oil and gas well. By "nearby", we mean close enough to be geologically correlatable such that the rock properties of the formations penetrated by the wellbore have sufficient similarity to those of the nearby well to make drill bit performance comparisons meaningful to a drilling engineer. Therefore, the present method provides rock property values that are useful to project formation drillability at a planned nearby well.

The rock properties determined with the inventive method can be applied to planning drill bit selection type and timing for various types of drill bits used to drill a well. However, diamond bit (such as polycrystalline diamond compact bit) performance is especially applicable. Polycrystalline diamond compact ("PDC") bits are well known in the oil and gas well drilling art. They are typically comprised of a thin layer of synthetic diamonds bonded to a tungsten carbide substrate.

Prior efforts at planning a bit selection program have been very subjective, as bit performance from nearby wells is heavily relied upon. Trial and error frequently dominate the selection criteria used in the nearby well.

Determination of Poisson's ratio, $\sigma$, is very useful when calculating rock mechanical properties such as compressive strength, angle of internal friction, and cohesive shear strength. Poisson's ratio is also useful for modelling seismic responses, borehole stresses, and acoustic responses of the selected formation(s). Poisson's ratio is dependent on pore fluid characteristics and on the shaliness of the selected formation(s). It is therefore desirable to determine Poisson's ratio for selected formations penetrated by a wellbore, which has been corrected for shaliness and fluid content, to determine various rock mechanical characteristics. These rock mechanical characteristics may be used to predict the characteristics of nearby rocks such as drillability, and formation stability.

In the inventive method, a set of electrical log data parameters comprising water saturation, porosity, and P-wave velocity, over a selected zone in a wellbore is provided. These types of electrical log data are well known in the art of oil and gas well logging and are readily available from an existing wellbore. In addition, electrical log data further comprising pore fluid density, pore fluid incompressibility, and the density and incompressibility of formation grains and matrix material may be available. If not, the inventive method calculates them.

The respective volumes of shale and those rocks that are not classified as shale ("non-shale") in the selected zone are determined by means well known in the well logging art. In some areas, it may be further necessary to include a third volume determination for carbonate rocks such as limestone and dolostone. The inventive method incorporates rock formation components, such as the respective percentages of shale, dolostone, limestone, and sandstone, to estimate the composite mechanical properties. A more rigorous formation composition analytical procedure could be included in the inventive method to analyze more exotic mineral assemblages, such as other evaporites, metamorphic rocks, or igneous rocks.

A fluid-corrected Poisson's ratio, with respect to water saturation, $\sigma_{sw}$ is then determined for the non-shale volume.

The preferred method for determining Poisson's ratio, is as follows:

$$\rho_f = S_w \rho_w + (1 - S_w) \rho_h \qquad (1)$$

where $S_w$ is water saturation derived from the electrical logs.

$\rho_f$ is pore fluid density from the logs.

$\rho_w$ is water density, which is equal to $1.1002 - 0.00000175$ (depth), where depth is the measured elevation corrected to sea level.

$\rho_f$ is hydrocarbon density, which is equal to $0.000002292$ (depth)$^{1.2173}$ for gas ($\rho_g$) and which is equal to $0.7584 - 0.000001625$ (depth) for oil ($\rho_o$).

These formation fluid density equations are used as default values, and if formation fluid samples are available, or other sources of fluid property values are available, they can be analyzed and input into equation (1).

$$\rho_b = \phi \rho_f + (1 - \phi) \rho_s \qquad (2)$$

where $\rho_b$ is bulk density.

$\phi$ is porosity derived from the logs by means known in the art.

$\rho_f$ is pore fluid density [see equation (1)].

$\rho_s$ is matrix density, which is equal to 2.65 for sandstone ($\rho_{ss}$).

2.73 for limestone ($\rho_{ls}$).

2.84 for dolostone ($\rho_{dol}$).

As before, the values listed above for matrix densities are default values, well known in the art. Actual values may be available from formation sample analysis.

$$K_f = [S_w/K_w + (1 - S_w)/K_h]^{-1} \qquad (3)$$

where $K_f$ is bulk modulus of the pore fluid.

$S_w$ is water saturation [see equation (1)].

$K_w$ is bulk modulus of the formation brine which is equal to $2.1508 + 0.00002875$ (depth).

$K_h$ is bulk modulus of the hydrocarbons which is equal to $0.00000127$ (depth)$^{1.1181}$ for gas ($K_g$) and is equal to $1.0896 - 0.00006288$ (depth) for oil ($K_o$).

Again, $K_w$ and $K_h$ are default values, known in the art, and actual values may be available from formation sample analysis.

$$S = 3(1-\sigma)/(1+\sigma) \quad (4)$$

where
- S is a calculation constant.
- $\sigma$ is Poisson's ratio for dry rock, derived from analyses of rock cores, taken at representative locations.

$$M = V_p^2/\rho_b(929.0 \times 10^{-10}) \quad (5)$$

where
- M is a second calculation constant.
- $V_p$ is P-wave velocity, derived from the logs, such as an acoustic log.
- $\rho_b$ is bulk density [see equation (2)].

$$A = S - 1 \quad (6)$$

where
- A is a third calculation constant.
- S is the calculation constant from equation (4).

$$B = \phi S[K_s/K_f - 1] - S + M/K_s \quad (7)$$

where
- B is a fourth calculation constant
- $\phi$ is porosity (see equation (2))
- S is the calculation constant from equation (4)
- $K_s$ is bulk modulus of the matrix solid, which is equal to
  - 41.0 for sandstone ($K_{ss}$)
  - 71.0 for limestone ($K_{ls}$)
  - 80.0 for dolostone ($K_{dol}$), as known in the art, unless actual formation samples are available for analysis.

$$C = -\phi(S - M/K_s)(K_s/K_f - 1) \quad (8)$$

where
- C is a fifth calculation constant
- S is from equation (4)
- M is from equation (5)
- $K_s$ is from equation (7)
- $K_f$ is from equation (3)

$$Y = (-B + (B^2 - 4AC)^{\frac{1}{2}})/2A \quad (9)$$

where
- Y is a sixth calculation constant
- B is from equation (7)
- A is from equation (6)
- C is from equation (8)

The six calculation constants, S, M, A, B, C, and Y are not necessary to carry out the inventive method, but are useful in making the calculations easier, especially if a computer program is used.

$$K_b = (1-Y)K_s \quad (10)$$

where
- $K_b$ is bulk modulus of dry rock
- Y is from equation (9)
- $K_s$ is from equation (7)

$$K_p = \phi/(7/K_b - 1/K_s) \quad (11)$$

where
- $K_p$ is bulk modulus of the pore volume
- $\phi$ is porosity, derived from the log data
- $K_b$ is from equation (10)
- $K_s$ is from equation (7)

$$\mu_b = \tfrac{3}{4}K_b(S-1) \quad (12)$$

where
- $\mu_b$ is shear modulus of dry rock
- $K_b$ is from equation (10)
- S is from equation (4)

A corrected P-wave velocity, $V_p$, in feet per second, is now determined, which accounts for the rock framework and the fluid content, whereby $$V_p^2 = 1/\rho_b[K_b + (4\mu_b)/3 + (1 - K_b/K_s)^2/((1 - \phi - K_b/K_s)/K_s) + \phi/K_f] \quad (13)$$

where
- $K_b$ is from equation (10)
- $\mu_b$ is from equation (12)
- $K_s$ is from equation (7)
- $\phi$ is porosity, derived from the log data
- $K_f$ is from equation (3)
- $\rho_b$ is from equation (2)

therefore, $$V_p = (V_p^2)^{\frac{1}{2}}(3280) \quad (14)$$

The calculations to derive P and S-wave velocities use the Gregory-Pickett solution to the Biot/Gaussman/Geertsma equation for the non-shale volume. The method inverts the Biot/Gaussman/Geertsma equation to determine the formation dry rock modulus and shear modulus, as outlined by Hilterman in the June 1990 issue of "The Leading Edge". The S-wave velocity, $V_s$, in feet per second, of the non-shale volume is now determined whereby $$V_s^2 = \mu_b/\rho_b \quad (15)$$

Therefore, $$V_s = (V_s^2)^{\frac{1}{2}}(3280) \quad (16)$$

Recorded S-wave data is almost never available, especially for relatively soft formations where refracted shear waves are not generated using conventional mono-pole acoustic logging tools. Therefore, the inventive method uses P-wave data and density measurements to determine S-wave velocity over the entire zone.

A fluid-corrected Poisson's ratio, $\sigma_{sw}$, for the non-shale volume, can now be determined whereby $$\sigma_{sw} = [0.5 - (V_s/V_p)^2]/[1.0 - (V_s/V_p)^2] \quad (17)$$

where
- $V_s$ is S-wave velocity from equation (16)
- $V_p$ is P-wave velocity from equation (14)

The S-wave velocity for the shale volume and corrected for fluid content, $V_{sc}$ can be determined whereby $$V_{sshl} = V_{pssh}/2.335 \quad (18)$$

where
- $V_{sshl}$ is the P-wave velocity of shale
- $V_{pssh}$ is the P-wave velocity of shale, derived from the $\Delta t_c$ of the bounding shale, where $\Delta t_c$ is the P-wave travel time measured by the conventional acoustic log in the bounding shale. This parameter is necessary to correct the composite formation acoustic velocities and Poisson's ratio for shale content. Shale volume will vary from formation to formation. If shale volume from the log data, $V_{shl}$, is at least 0.2, then $$V_{sshl} = [(304.8/\Delta t_c - 1.36)/1.16[3280.84$$

which is a representation of the "Arco mud rock relationship," as outlined by Gastagna et al. in 1985. This 0.2 cutoff value can be adjusted based on an analysis of actual shale composition, if samples are available. The inventive method can therefore incorporate detailed mineral assemblages, assign acoustic values for clay components, and then combine the clay components to produce acoustic values for a given shaly sequence. Therefore, the S-wave velocity for the shale volume, corrected for fluid content may be expressed as $$V_{sc} = [(1.0 - V_{shl})/V_s + (V_{shl}/V_{sshl})]^{-1} \quad (19)$$

The non-shale and the shale volume acoustics values are then combined, using separately modelled layers. A corrected Poisson's ratio, $\sigma_c$, for the selected zone, where the correction relates to shale volume and fluid composition, may be expressed as $$\sigma_c = [0.5 - (V_{sc}/V_p)^2 / [1.0 - (V_{sc}/V_p)^2] \quad (20)$$

where $V_{sc}$ is from equation (19)
$V_p$ is from equation (14)

This corrected value of Poisson's ratio may be used to accurately determine additional rock mechanical properties that relate to drillability and formation stability. P-wave velocity $V_p$ is dependent on the bulk modulus of the pore fluid, $K_f$. Therefore, as pore fluids change, P-wave velocity changes substantially. Shear wave velocity, $V_s$, doesn't change as much with pore fluid change, and is more a function of bulk density, $\rho_b$. Therefore, if P-wave velocity changes in a formation, the value of Poisson's ratio changes. It is the change in the corrected Poisson's ratio, $\sigma_c$, that enables a prediction of, for example, shale and sandstone break-down pressure.

In another embodiment of the invention, rock mechanical properties which are a measure of formation and borehole strength and failure character are determined. Once the corrected value of Poisson's ratio, $\sigma_c$, is known, the uniaxial compressive strength, $S_c$, is estimated as a function of the computed shear wave velocity, $V_{sc}$ $$S_c = A \log V_{sc} = B \quad (21)$$

where $V_{sc}$ is from equation (19)

Figure 1:
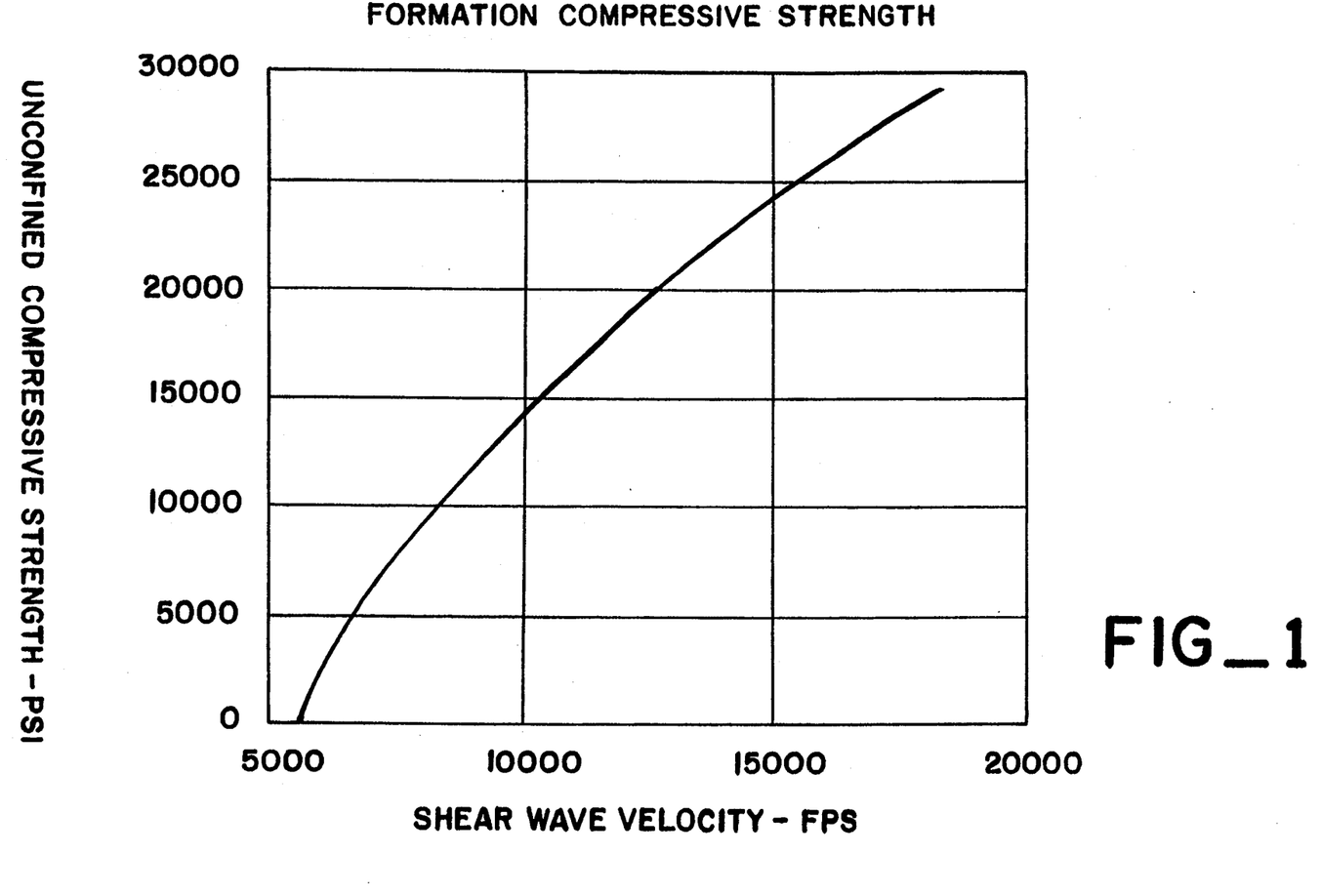
FIG. 1 is a graph illustrating the relationship of shear wave velocity to formation compressive strength.

Uniaxial compressive strength is known to be related to drill bit performance, from laboratory studies. Compressive strength can also be shown to be related to S-wave velocity, as shown in FIG. 1. The data points are from rock cores taken from various locations.

The angle of internal friction, $\Theta$, can also be determined where $$\Theta = \sin^{-1}(1.0 - \sigma_c)/(1.0 + \sigma_c) \quad (22)$$

where $\sigma_c$ is from equation (20)

This expression for the angle of internal friction was disclosed by Turk and Dearman in 1986 in "Estimation of Friction Properties of Rock From Deformation Measurements", Chapter 14, Proceedings of the 27th U.S. Symposium on Rock Mechanics, Tuscaloosa, Ala., Jun. 23-25, 1986. The function predicts that as Poisson's ratio changes with changes in water saturation and shaliness [as shown by equations (1)-(20)], the angle of internal friction changes. The angle of internal friction is therefore also related to rock drillability and therefore to drill bit performance.

The cohesive shear stress of the formation, $S_o$, may also be determined, as $$S_o = (S_c(1.0 - \sin\Theta))/(2.0 \cos\Theta)$$

where $\Theta$ is from equation (22) (23)

Figure 2:
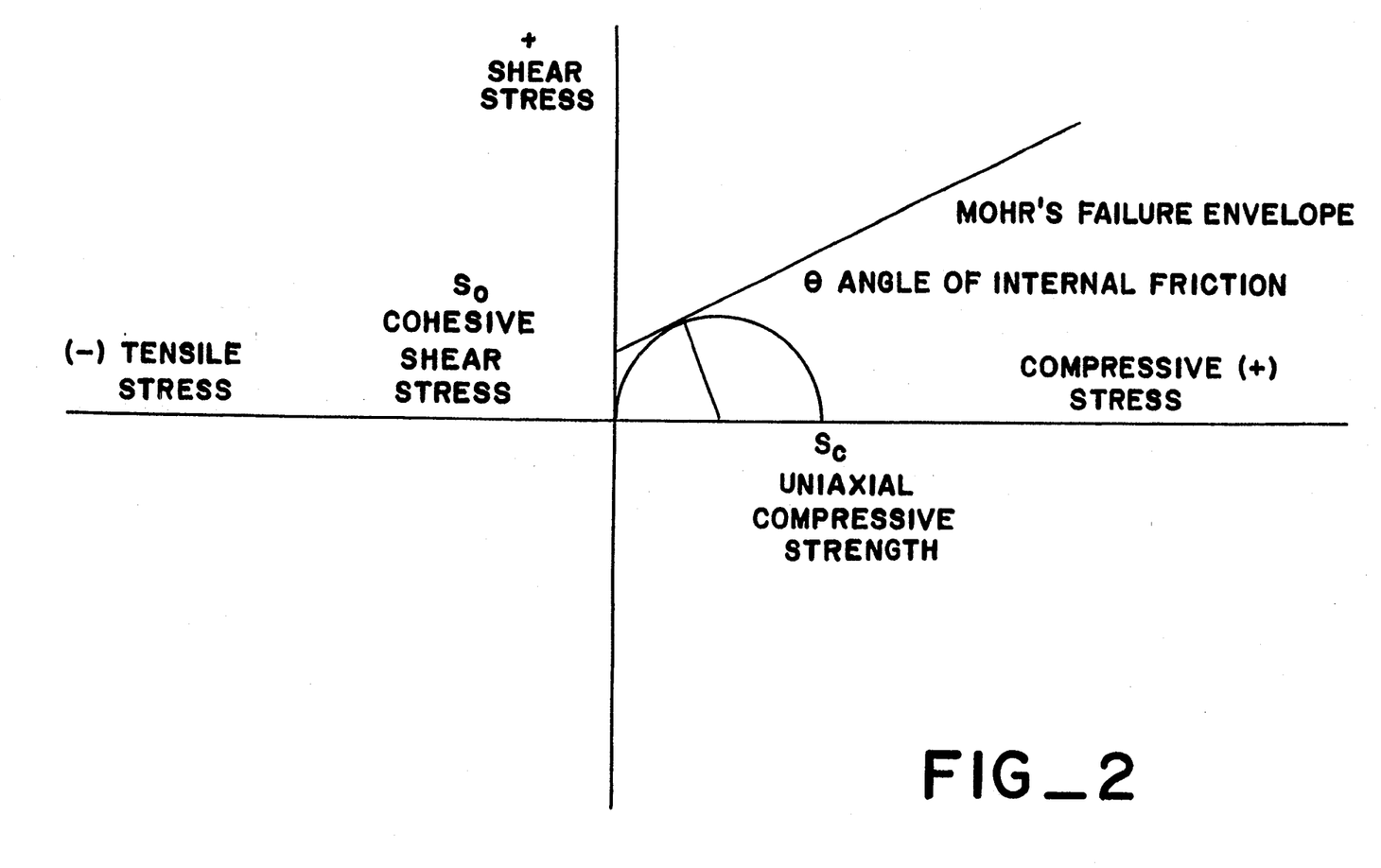
FIG. 2 illustrates the definition of Mohr's failure envelope, as a function of angle of internal friction, compressive stress, shear stress, and tensile stress.

As the angle of internal friction decreases, cohesive shear strength decreases. Such a decrease in rock strength is related to the drillability of the rock. Therefore, Mohr's failure envelope can be defined continuously in the borehole, as shown in FIG. 2.

In the preferred embodiment, the rock mechanical property values described above are determined for selected layers in the selected well, based on geologic and geomechanical character. The values are then combined to create a model for the proposed wellbore.

From these rock mechanical properties determined over a selected zone in a wellbore, an interpreter can use a geologic correlation made to the location of a proposed well to predict the geomechanical character and the drillability of the geologic formations encountered and therefore can select the optimum type(s) of drill bits to be used and the optimum depths for changing drill bits. An interpreter may use only the uniaxial compressive strength, only the angle of internal friction, only the cohesive shear stress of the formations, or may use any combination thereof to predict the drillability of a well which is nearby an existing well. In addition, the corrected value of Poisson's ratio may be used to derive other rock mechanical property values that relate to formation strength, stability and/or drillability.

FIELD EXAMPLE

A well ("test well") located in the South Timbalier Block 135 Field, in the Gulf of Mexico, approximately 35 miles offshore of Lafourche Parish, La. was drilled using the inventive method, as a field test. The test well was designed to test the same sands up dip to a nearby offset well ("nearby well") that was drilled 1600 feet away.

PDC bits had been previously run in the South Timbalier 135 Field area. The test well bit recommendations were made based on relating unconfined compressive strength [as determined by equation (21)] estimates from electrical log data from the nearby well. Exact measures of compressive strength of the formations encountered in the nearby well are not necessary, as the relative compressive strengths of the formations encountered by the test well, compared to the nearby well are what is important.

Figure 3:
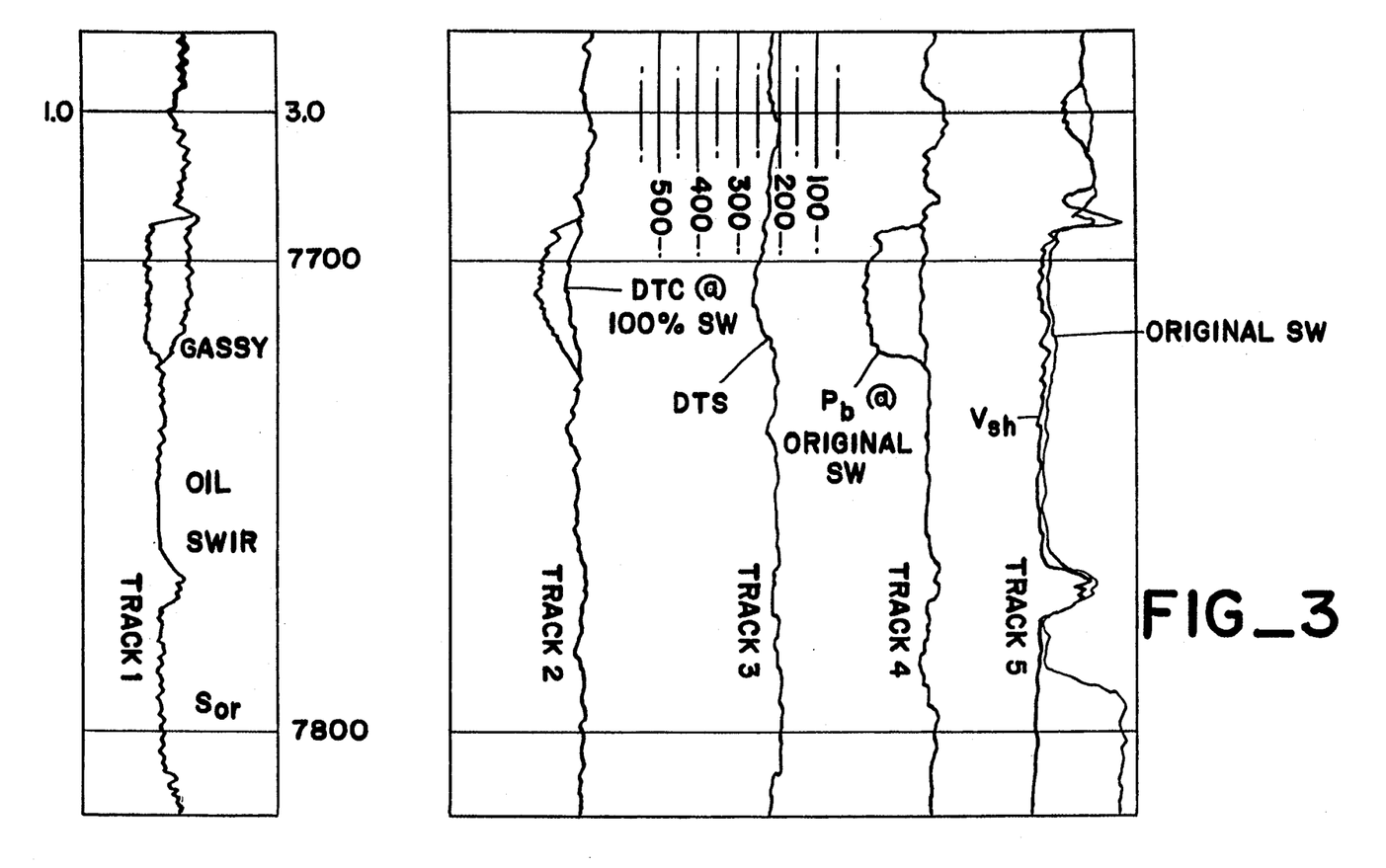
FIG. 3 illustrates log plots S-wave travel time and acoustic properties determined with the inventive method.
Figure 4:
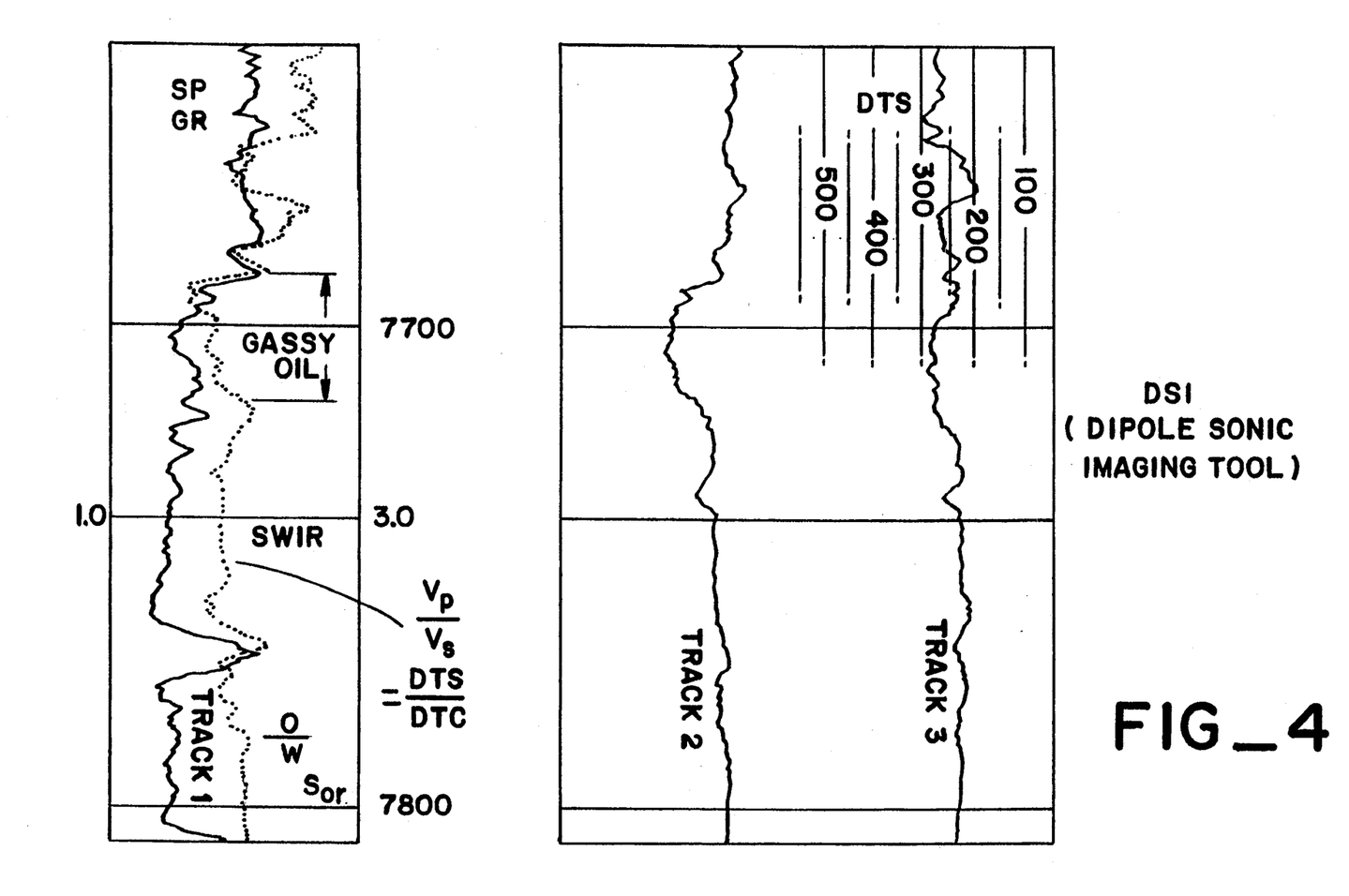
FIG. 4 illustrates log plots of S-wave travel times and acoustic properties determined with Schlumberger's ™ Dipole Shear Imaging Tool.

FIGS. 3 and 4 illustrate log plot comparisons of S-wave travel times determined using the inventive method (FIG. 3) with "measured" S-wave travel times using Schlumberger's TM Dipole Shear Imaging ("DSI") tool (FIG. 4) for the same well. Units are in micro-seconds/ft. The inventive method shown in FIG. 3 depicts formation acoustic properties at various water/oil/gas saturations. Note the S-wave travel time estimates designated $\Delta TS$ or DTS on the middle or 3rd log display track. The S-wave travel time ranges from 200 micro-seconds/ft to 280 micro-seconds/ft. Other tracks shown in FIG. 3 include the S-wave to P-wave velocity ratio (or S-wave travel time to compressional wave travel time ratio) scaled 1.0–3.0 in track 1; the compressional wave travel time scaled 250–50 microseconds/ft in track 2; the bulk density curve scaled 1.65–2.65 gm/cc in track 4; and the original water saturation (Sw) scaled 0–100% and formation shale volume scaled 0–100% in track 5. The Schlumberger DSI tool S-wave travel time estimate for the same interval ranges from approximately 220 micro-seconds/ft to 300 microseconds/ft (FIG. 4-track 3). The travel times for the inventive method are slightly faster (smaller) than the DSI tool "measured" values. When it is taken into account that the "measured" S-wave travel times derived from the DSI tool have been found historically to average 7.4% (and as high as 20%) too slow, the comparison of the "faster" S-wave travel time estimates from the inventive method are very accurate. Other curves displayed on FIG. 4 include the gamma ray curve scaled 0 to 100 API units and the S-wave travel time to compressional wave travel time ratio scaled 1.0–3.0; and the compressional travel time curve scaled 250–50 microseconds/ft in track 2.

Figure 5:
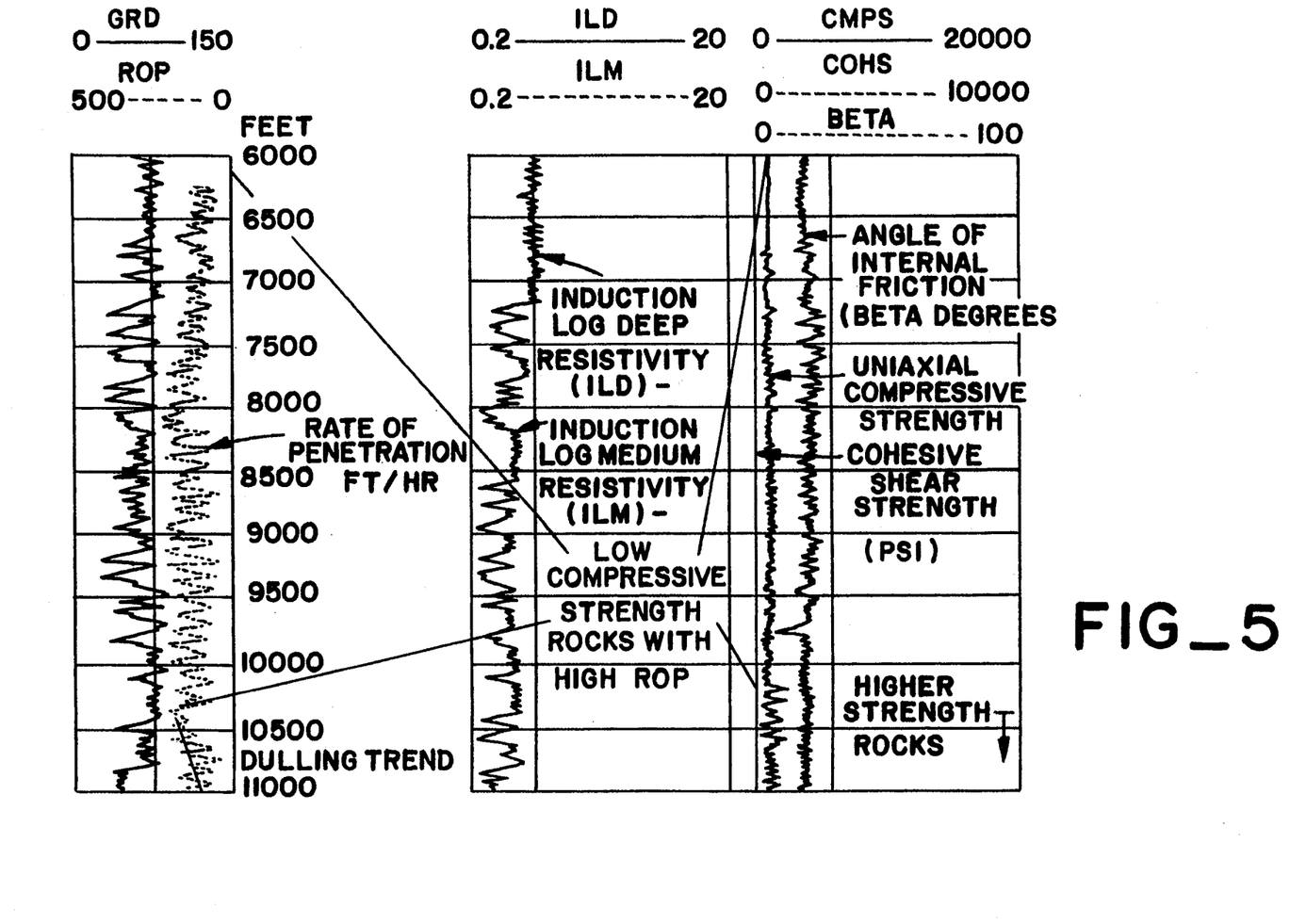
FIG. 5 shows a comparison of rate of penetration with compressive strength, cohesive shear strength, and angle of internal friction using the inventive method.

FIG. 5 shows a comparison of drilling data (rate of penetration-ROP) from the test well with the log plotted values of compressive strength (CMPS), cohesive shear strength (COHS), and angle of internal friction (BETA) determined for the same well using the inventive method. The compressive strength curve shows that low strength formations are dominant down to 10,500'TVD (true vertical depth). Based on the determined compressive strength, a relatively aggressive Diamond Boart TM DBS TD 19M drill bit was recommended. The ROP (rate of penetration) curve on track 1 on the log shows actual bit performance for the test well. The ROP base line remained at over 100 feet per hour down to about 10,650' TVD when a strong "dulling" trend was observed. At this depth, rock compressive strength is observed to increase rapidly. A second, less pronounced dulling trend is observed at 11,200' TVD. The drill bit was kept in the hole down to 14,830' TVD, averaging less than 30 feet per hour when it was pulled out of the wellbore. The nearby well required 9 drill bits to drill the same footage over the same geologically equivalent interval.

The deeper and harder formation interval was drilled with a Hycalog TM DS46H PDC drill bit, which is heavier set with a smaller number of cutters than the prior bit. This bit averaged 43 feet per hour before being pulled for a logging run. The nearby well required about 4 drill bits to drill the same interval at ⅓the ROP.

Figure 6:
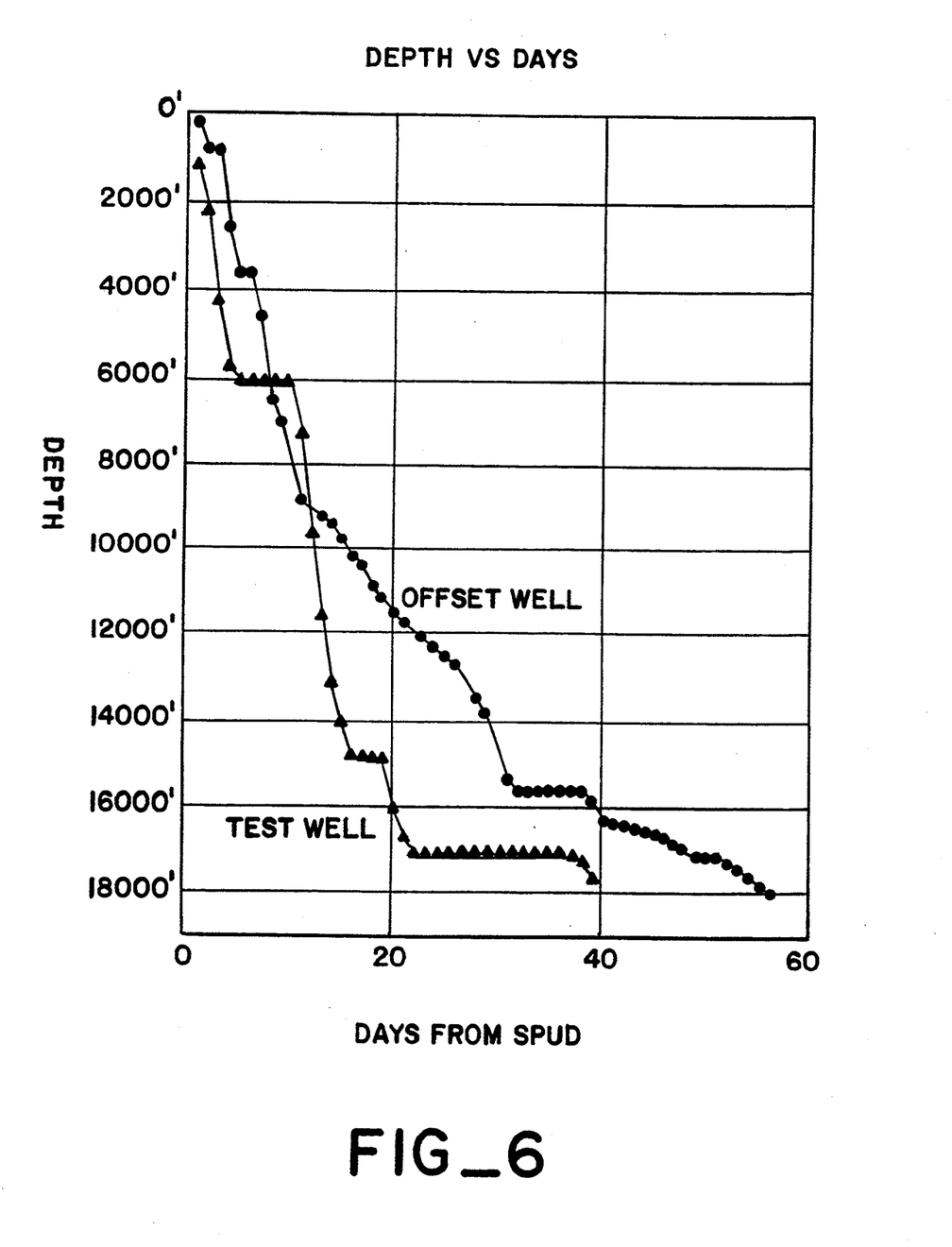
FIG. 6 is a graph illustrating the amount of feet that drilled per day, for both the test well and a nearby well.

FIG. 6 is a graph that illustrates the amount of feet that were drilled per day, for both the test well and the nearby well. Note that the test well drilled at a much faster rate than the nearby well, for all depths below about 6000 feet. It is estimated that $1.49 million dollars were saved while drilling the test well, due to the increased drill rate and decreased time spent pulling the drill string to change drill bits, which resulted from selecting drill bits based on the inventive method of determining rock mechanical properties of the nearby well, based on electrical log data.

While a preferred embodiment of the invention has been described and illustrated, it should be apparent that many modifications can be made thereto without departing from the spirit or scope of the invention. Accordingly, the invention is not limited by the foregoing description, but is only limited by the scope of the claims appended hereto.

What is claimed is:

1. A method for selecting a drill bit for use in drilling a well comprising the steps of:
   (a) providing a set of electrical log data parameters comprising water saturation, porosity, and P-wave velocities over a selected zone in a nearby wellbore;
   (b) determining the respective volumes of shale and non-shale for said zone;
   (c) determining a fluid-corrected Poisson's ratio for said non-shale volume by determining pore fluid density, bulk density, bulk modulus of the pore fluid, bulk modulus of dry rock, bulk modulus of pore volume, shear modulus of dry rock, corrected P-wave velocity, and corrected S-wave velocity;
   (d) determining the S-wave velocity of said shale volume;
   (e) determining a corrected Poisson's ratio for said selected zone, said correction relating to said shale volume and fluid composition;
   (f) determining the uniaxial compressive strength over said zone, as a function of S-wave velocity; and
   (g) selecting a drill bit for use in drilling said well based on said determined compressive strength and a geologic correlation made with said nearby well.

2. The method as recited in claim 1 further comprising the step of determining the angle of internal friction over said zone, as a function of said corrected Poisson's ratio, following step (f) and preceding step (g) therein.

3. The method as recited in claim 1 further comprising the step of determining the cohesive shear strength over said zone as a function of said compressive strength and said angle of internal friction, following the step of determining said angle of internal friction and preceding step (g) therein.

* * * * *